(12) United States Patent
Yoshihara et al.

(10) Patent No.: US 7,987,657 B2
(45) Date of Patent: Aug. 2, 2011

(54) RIDING LAWN MOWER

(75) Inventors: Yoshio Yoshihara, Saitama (JP);
Takahiro Yamamoto, Saitama (JP);
Tomomi Nakaya, Saitama (JP); Makoto Warashina, Saitama (JP); Katsuhisa Ichikawa, Saitama (JP); Kazuki Shimozono, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 54 days.

(21) Appl. No.: 12/387,983

(22) Filed: May 11, 2009

(65) Prior Publication Data
US 2009/0282796 A1    Nov. 19, 2009

(30) Foreign Application Priority Data

May 13, 2008    (JP) .................................. 2008-126470

(51) Int. Cl.
*A01D 34/00*    (2006.01)
(52) U.S. Cl. .............................. 56/17.4; 56/1; 56/320.1
(58) Field of Classification Search ............... 56/1, 17.4, 56/320.1, DIG. 9, DIG. 22, DIG. 24, 17.1, 56/DIG. 20
See application file for complete search history.

(56) References Cited

U.S. PATENT DOCUMENTS

| 2,865,159 | A | * | 12/1958 | Musgrave ....................... 56/14.7 |
| 3,391,524 | A | * | 7/1968 | Nickoloff et al. ............. 56/320.2 |
| 3,522,694 | A | * | 8/1970 | Horn .............................. 56/16.9 |
| 4,733,522 | A | * | 3/1988 | Johansson ...................... 56/17.4 |
| 6,065,276 | A | * | 5/2000 | Hohnl et al. .................. 56/320.1 |
| 7,469,525 | B2 | * | 12/2008 | Zeigler et al. ................ 56/320.1 |

FOREIGN PATENT DOCUMENTS

| JP | 63-193411 | 12/1988 |
| JP | 02-148226 | 12/1990 |
| JP | 07-7695 | 3/1995 |

* cited by examiner

*Primary Examiner* — Alicia M Torres
(74) *Attorney, Agent, or Firm* — Carrier Blackman & Associates, P.C.; William D. Blackman; Joseph P. Carrier

(57) ABSTRACT

A riding lawn mower having covers for covering the side part of a cutter deck and the side part of a transmission section. The covers have a plurality of small holes formed in a portion facing the side part of the cutter deck. The accumulation of grass clippings on the upper surface of the cutter deck and the transmission section is reduced, and the state of accumulation of grass clippings is confirmed via the small holes.

6 Claims, 11 Drawing Sheets

RIDING LAWN MOWER

FIELD OF THE INVENTION

The present invention relates to an improvement for a riding lawn mower provided with a transmission section at the top of an elevatable cutter deck and configured so that the periphery of the transmission section is covered by a cover.

BACKGROUND OF THE INVENTION

A riding lawn mower accommodates a cutter blade in an elevatable cutter deck, and mows lawn grass with the cutter blade. A plurality of cutter blades is often arranged in the width direction of the vehicle. The lawn-cutting height can be varied by adjusting the height of the cutter deck. The transmission section provided at the top of the cutter deck is covered by a cover. Such a riding lawn mower is known from, for example, Japanese Utility Model Application Laid-Open Publication No. 63-193411 (JP-U 63-193411 A), Japanese Utility Model Publication No. 07-7695 (JP-U 07-7695 B), and Japanese Utility Model Application Laid-Open Publication No. 02-148226 (JP-U 02-148226 A).

The riding lawn mower disclosed in JP-U 63-193411 A has a structure in which a cutter deck is elevatably mounted using a link mechanism in the center section of the vehicle body, a plurality of cutter blades is accommodated in the cutter deck, and a cover is mounted on the link mechanism. The cover covers only the transmission section and is arranged on the upper surface of the cutter deck.

The riding lawn mower disclosed in JP-U 07-7695 B has a structure in which a cutter deck is elevatably mounted using a link mechanism in the center section of the vehicle body, a plurality of cutter blades is accommodated in the cutter deck, and a cover is mounted on the link mechanism. The cover covers the right and left sides of the transmission section excluding the center portion.

The riding lawn mower disclosed in JP-U 02-148226 A has a structure in which a cutter deck is elevatably mounted using a link mechanism in the center section of the vehicle body, a plurality of cutter blades is accommodated in the cutter deck, and a cover is swingably mounted in the vertical direction on the upper surface of the cutter deck. The cover covers the transmission section and serves as a floor on which the vehicle occupant rides when the cover placed over the upper surface of the cutter deck.

A transport airflow (rotation wind) is generated inside the cutter deck when the cutter blades rotate and perform a mowing operation. The transport airflow is used for transporting the cut grass clippings from the cutter deck to a grass clippings container (the bagging method). The transport airflow is used for discharging grass clippings from the left or right side of the cutter deck in relation to the forward direction of the riding lawn mower (side discharge method). However, a portion of the transport airflow escapes from the edge of the cutter deck and moves upward (blows upward). In particular, since the cutter deck for accommodating a plurality of cutter blades is large, the flow of the transport airflow that escapes from the edge and moves upward is also considerable. The transport airflow that has moved upward includes grass clippings. A portion of the dispersed grass clippings may be deposited on the upper surface of the cutter deck. Since a cover that covers the transmission section is arranged on the upper surface of the cutter deck, a portion of the dispersed grass clippings may enter the gap between the cutter deck and the cover. Grass clippings that have entered inside the cover are difficult to discharge.

SUMMARY OF THE INVENTION

An object of the present invention is to provide a riding lawn mower wherein the accumulation of dispersed grass clippings on the upper surface of the cutter deck and inside the transmission section cover can be reduced and the state of accumulation can be readily confirmed.

In accordance with the first aspect of the present invention, there is provided a riding lawn mower comprising a vehicle body having rear wheels and front wheels; a cutter deck having an open lower surface, the deck being elevatably disposed in a central lower section of the vehicle body; cutter blades accommodated inside the cutter deck; and a transmission section for transmitting the power of a power source to the cutter blades, the section being disposed in proximity to an upper surface of the cutter deck, wherein covers for enclosing a space below the vehicle body are provided across substantially the entire range between the front and rear wheels; the covers cover a side part of the cutter deck and a side part of the transmission section; and the covers are mounted on the vehicle body and have a plurality of small holes for allowing the cutter deck inside the covers to be viewed from the outside across a range facing the side part of the cutter deck.

In this manner, the accumulation of dispersed grass clippings on the upper surface of the cutter deck and inside the transmission section cover can be reduced by using covers to cover the side part of the cutter deck and the side part of the transmission section. Also, the state of accumulation of dispersed grass clippings that have accumulated on the upper surface of the cutter deck and around the transmission section can be readily confirmed from the exterior via a plurality of small holes formed in the side part of the cover. For example, the state of accumulation can be confirmed and cleaning can be performed as required prior to work. As a result, the transmission section can be constantly kept in an optimal operating state. The inside of the covers can be washed by spraying water from the exterior to the inside of the covers by way of the small holes. Air permeability and ventilation inside and outside the covers can be provided via the small holes.

It is preferred that the covers have a side part shaped as a step, and that stepped surfaces thereof be configured so as to cover at least a portion of the upper surface of the cutter deck while allowing elevatable movement of the cutter deck. Therefore, the top section of the covers can be made smaller than the lower section. Accordingly, the cover can be made smaller.

It is preferred that the cutter deck have two front and rear guard sections for preventing transport airflow and grass clippings that have escaped from the cutter deck to the exterior from moving upward, that the front guard section extend forward from a front end part of the cutter deck, and that the rear guard section extend rearward from a rear end part of the cutter deck. Therefore, grass clippings that have escaped together with the transport airflow from the front edge of the cutter deck to the exterior can be prevented by the front guard section from moving upward (blown upward) to the upper surface of the cutter deck and can be made to fall downward. Grass clippings that have furthermore escaped together with the transport airflow from the rear edge of the cutter deck to the exterior can be prevented by the rear guard section from moving upward to the upper surface of the cutter deck and can be made to fall downward. Accordingly, the accumulation of dispersed grass clippings on the upper surface of the cutter deck and inside the transmission section cover can be further reduced.

BRIEF DESCRIPTION OF THE DRAWINGS

Several preferred embodiments of the present invention will be described in detail below, by way of example only, with reference to the accompanying drawings, in which.

DETAILED DESCRIPTION OF THE PREFERRED EMBODIMENTS

Figure 1:
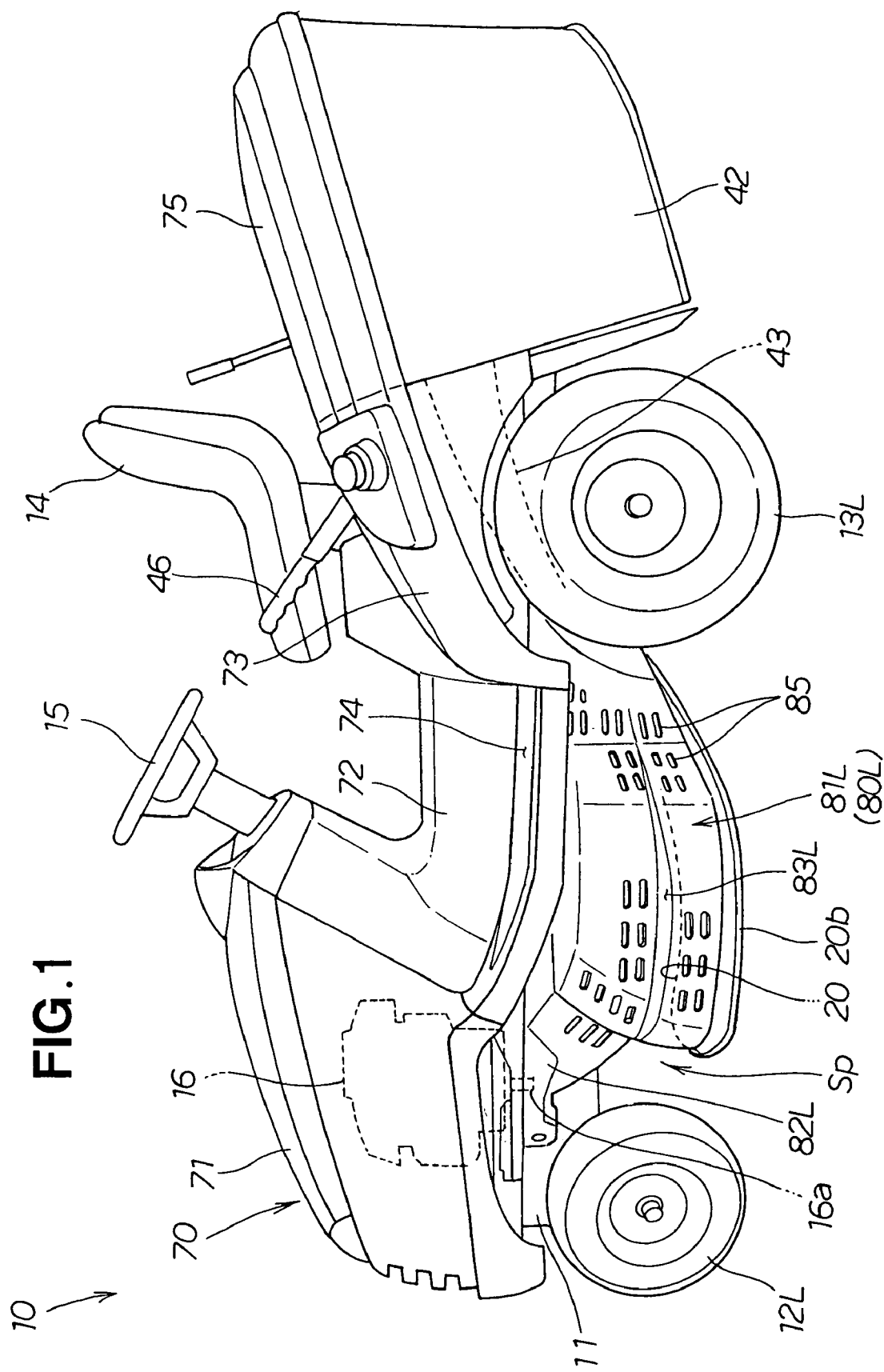
FIG. 1 is a left side view of a riding lawn mower according to the present invention.
Figure 2:
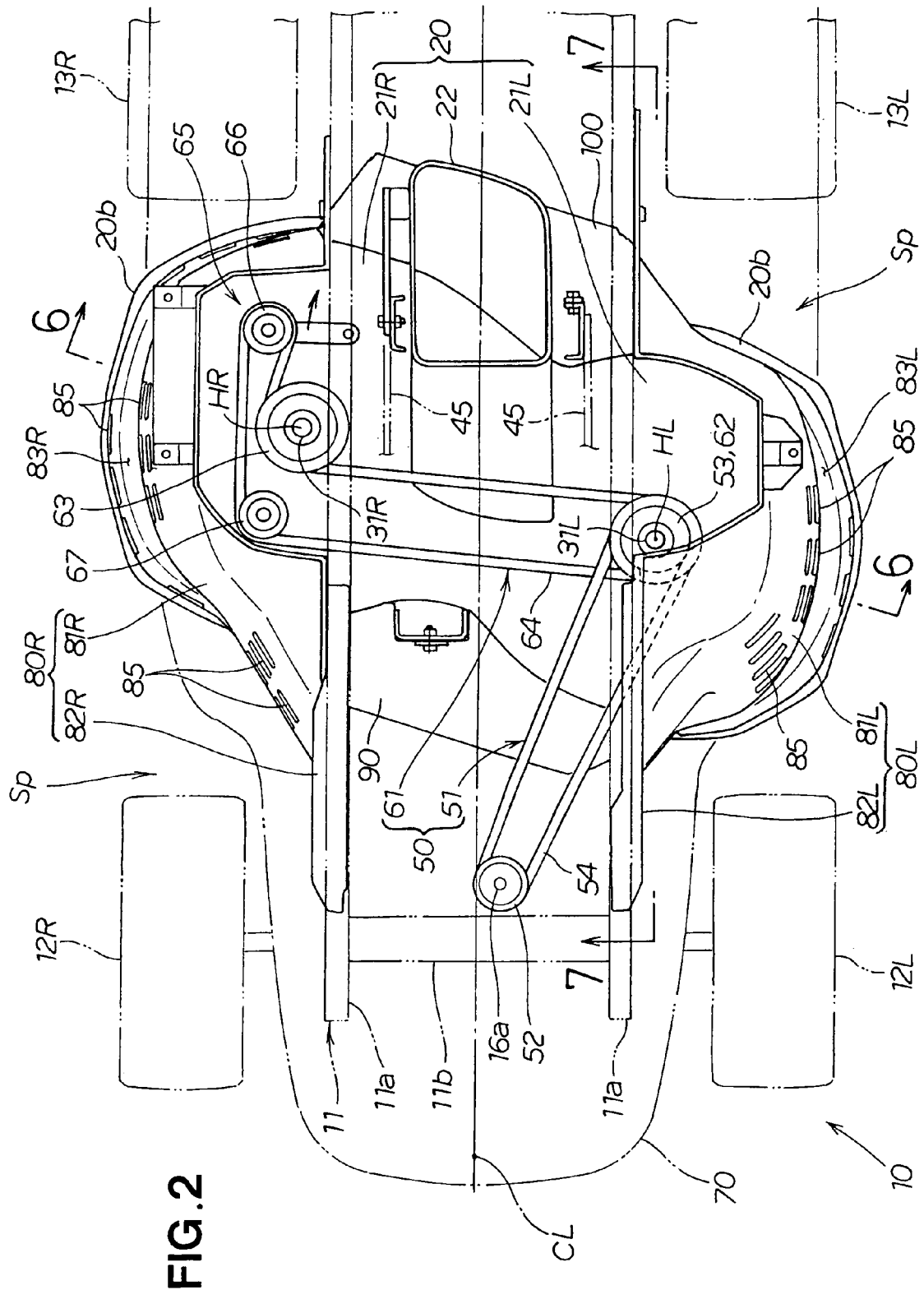
FIG. 2 is a top plan view of the lawn mower with a vehicle body removed.
Figure 5:
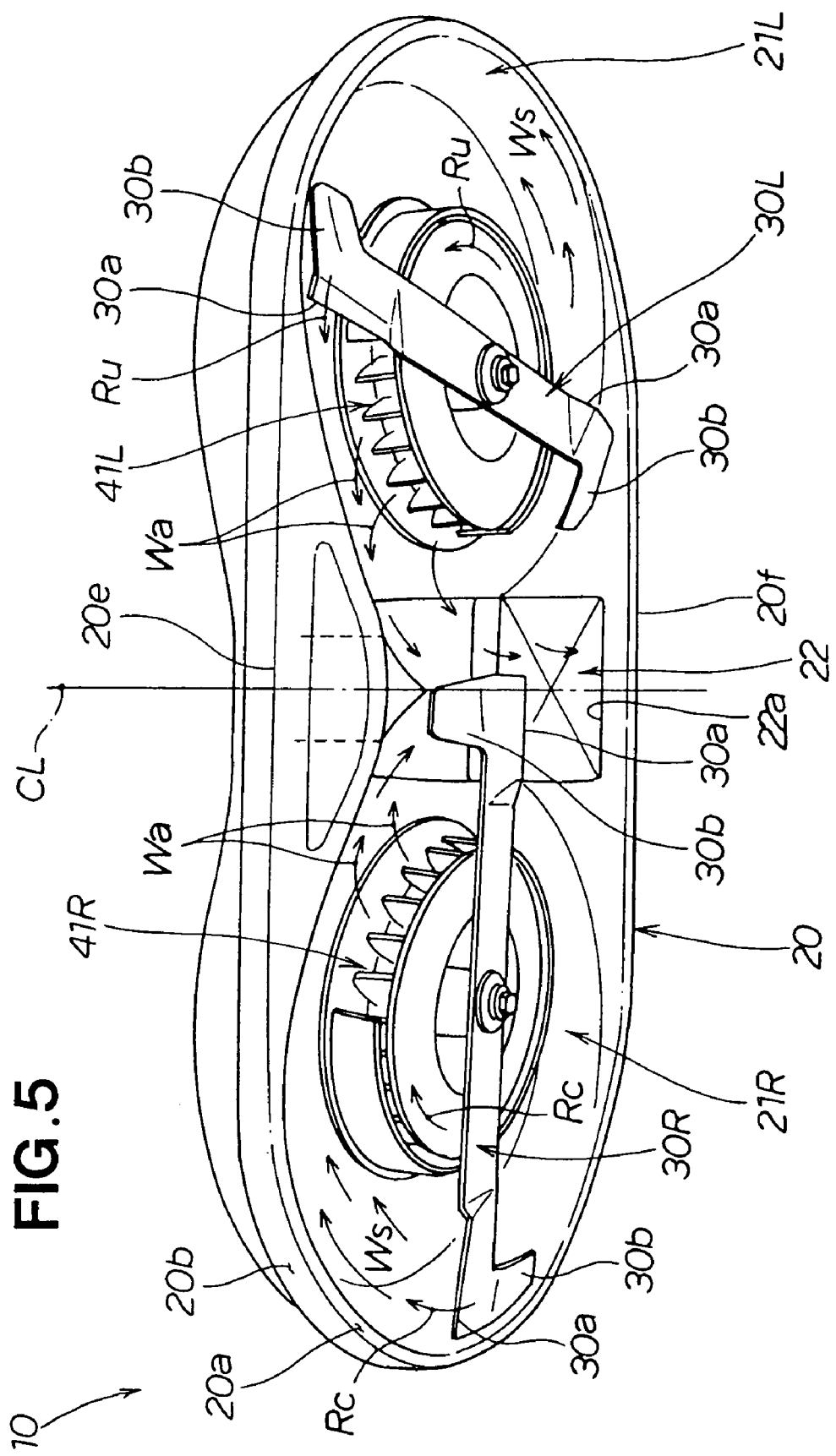
FIG. 5 is a view of the cutter deck as seen in the direction of arrow 5 of FIG. 4.

The riding lawn mower 10 shown is FIGS. 1, 2, and 5 is a type of lawn mower ridden and operated by a worker. The riding lawn mower 10 has a vehicle body 11, left and right front wheels 12L, 12R and left and right rear wheels 13L, 13R provided to the front and rear of the vehicle body 11, a rider's seat 14 provided to the rear upper part of the vehicle body 11, a steering device 15, a power source 16 provided to the front part of the vehicle body 11, a cutter deck 20 provided to the center and lower part of the vehicle body 11, two left and right cutter blades 30L, 30R and two left and right auxiliary fans 41L, 41R provided inside the cutter deck 20, a grass clippings container 42 disposed behind the cutter deck 20 and provided to the rear part of the vehicle body 11, and a shooter 43 connected from the cutter deck 20 to the grass clippings container 42. The auxiliary fans 41L, 41R are optionally provided to the riding lawn mower 10.

The vehicle body 11 is a vehicle body frame referred to as a so-called "ladder frame." In this frame, a plurality of cross members 11b (only one is shown) is disposed across left and right forwardly and rearwardly extending side frames 11a, 11a, as shown in FIG. 2. The side frames 11a, 11a are square pipes or other members having a hollow square cross section. The area between the left and right side frames 11a, 11a has a fixed interval in the width direction of the vehicle.

The left and right front wheels 12L, 12R are steering wheels, and the left and right rear wheels 13L, 13R are drive wheels. The power source 16 has a downwardly extending output shaft 16a; generates power for driving the left and right rear wheels 13L, 13R, the cutter blades 30L, 30R, and auxiliary fans 41L, 41R; and comprises, e.g., an engine or an electric motor. The power of the power source 16 is transmitted to the cutter blades 30L, 30R and the auxiliary fans 41L, 41R by way of a transmission section 50. The transmission section 50 will be described later in detail.

The cutter deck 20 is elevatably provided to the vehicle body 11 via a link mechanism 45 (FIG. 2). The cutter deck 20 can be set to an arbitrary height via the link mechanism 45 by manually operating an elevation adjustment lever 46 (FIG. 1). The height of the lawn mowing can be varied by adjusting the height of the cutter deck 20. The link mechanism 45 is a well-known configuration in riding lawn mowers, and a description is not provided herein.

The cutter deck (housing) 20 includes a main deck body 20m (FIGS. 3, 4) which is formed substantially in a laterally disposed figure-eight shape as viewed from above in order to accommodate the two left and right cutter blades 30L, 30R, as shown in FIGS. 2 to 5. The lower surface 20a (lower end surface) is open, and a flange 20b is integrally formed on the main deck body 20m, extending about the external periphery of the open edge of the lower surface. The main deck body 20m of the cutter deck 20 is composed of a left half body 21L of the left half, a right half body 21R of the right half, and a grass clippings discharge pathway 22 positioned in the centerline CL in the width direction of the vehicle.

Figure 3:
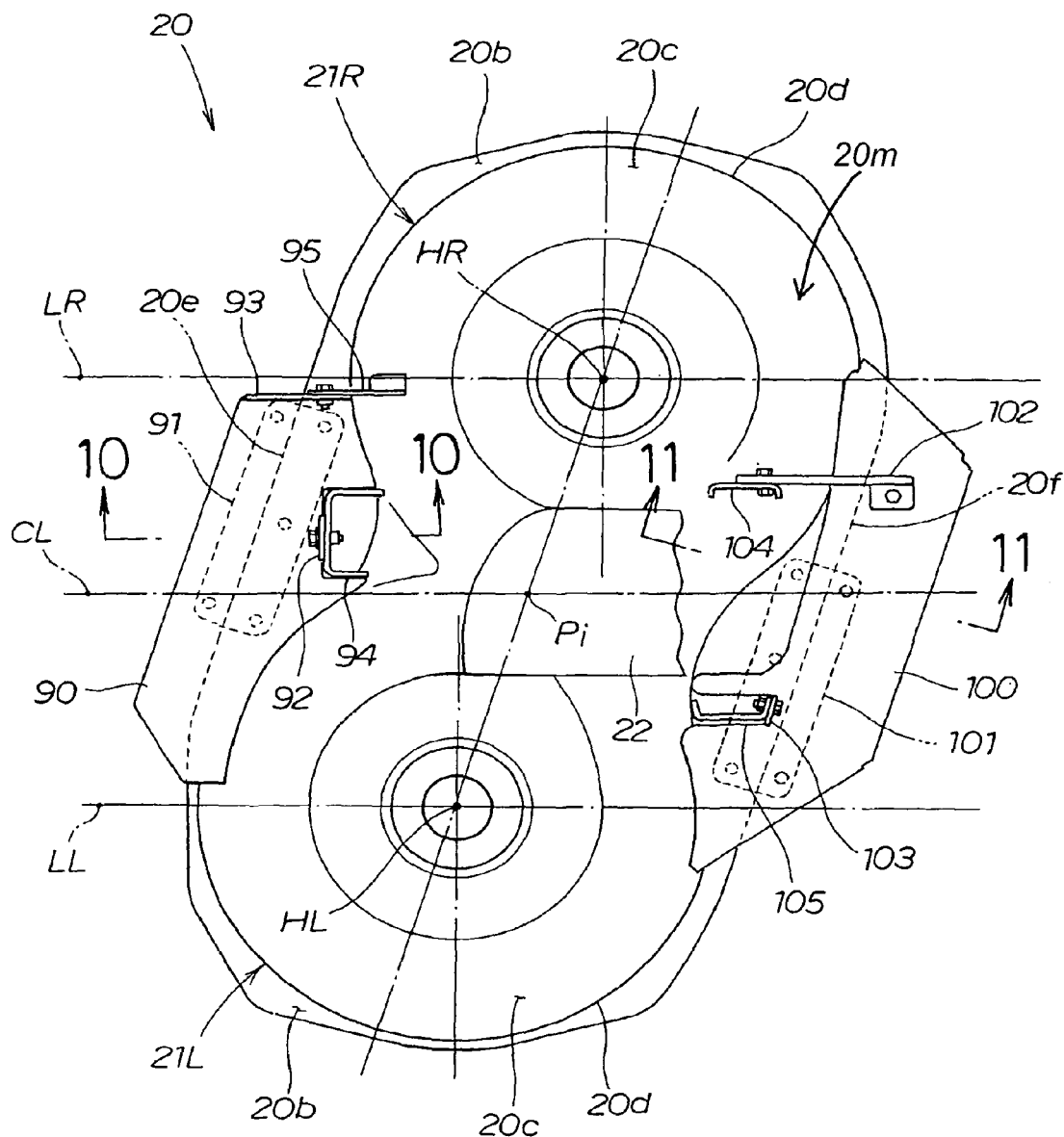
FIG. 3 is a top plan view of a cutter deck of FIG. 2.

The center HR of the right half body 21R is eccentric in the rearward direction in relation to the center HL of the left half body 21L when the cutter deck 20 is viewed from above, as shown in FIG. 3. In other words, in FIG. 3, the centerline CL in the width direction of the vehicle extends in the forward/rearward direction, and the left half body 21L and the right half body 21R are formed substantially in a point symmetrical shape in relation to a predetermined point Pi that passes through the centerline CL in the width direction of the vehicle.

The left half body 21L is a portion for accommodating the left cutter blade 30L and the auxiliary fan 41L, and is formed in the shape of a circle as viewed from above, as shown in FIGS. 3 and 5. The right half body 21R is a portion for accommodating the right cutter blade 30R and the right auxiliary fan 41R, and is formed in the shape of a circle as viewed from above. The left half body 21L and the right half body 21R are in communication with each other at the centerline CL in the width direction of the vehicle. The grass clippings discharge pathway 22 brings out the grass clippings from the cutter deck 20 to the shooter 43 (FIG. 1) with the aid of the transport airflow. The shooter 43 is disposed above the cutter deck 20.

Figure 4:
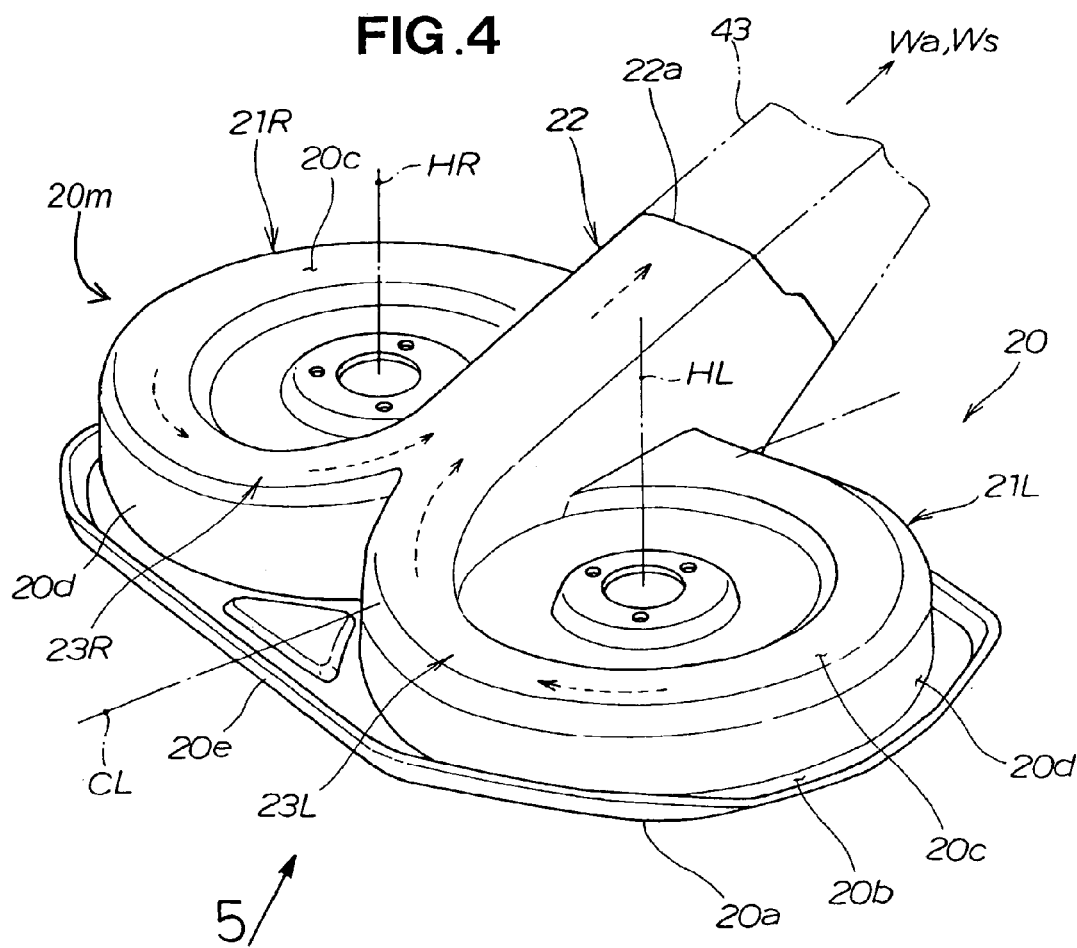
FIG. 4 is a perspective view of the cutter deck of FIG. 2.

The left half body 21L has a scroll part 23L that gradually protrudes upward while spiraling in the rightward direction, and the right half body 21R has a scroll part 23R that gradually protrudes upward while spiraling in the leftward direction, when the cutter deck 20 is viewed from above, as shown in FIG. 4. In this manner, the left half body 21L and the right half body 21R are spiral casings (spiral case, scroll case) provided with the scroll parts 23L, 23R for causing the grass clippings to move toward the grass clippings discharge pathway 22 while moving in a circular fashion, as shown by the arrows inside the cutter deck 20. The grass clippings discharge pathway 22 extends in the upward and rearward direction from the end of the spirals of the left and right scroll parts 23L, 23R, and the rear end of the grass clippings discharge pathway 22 has a discharge port 22a for connecting to the shooter 43.

Figure 6:
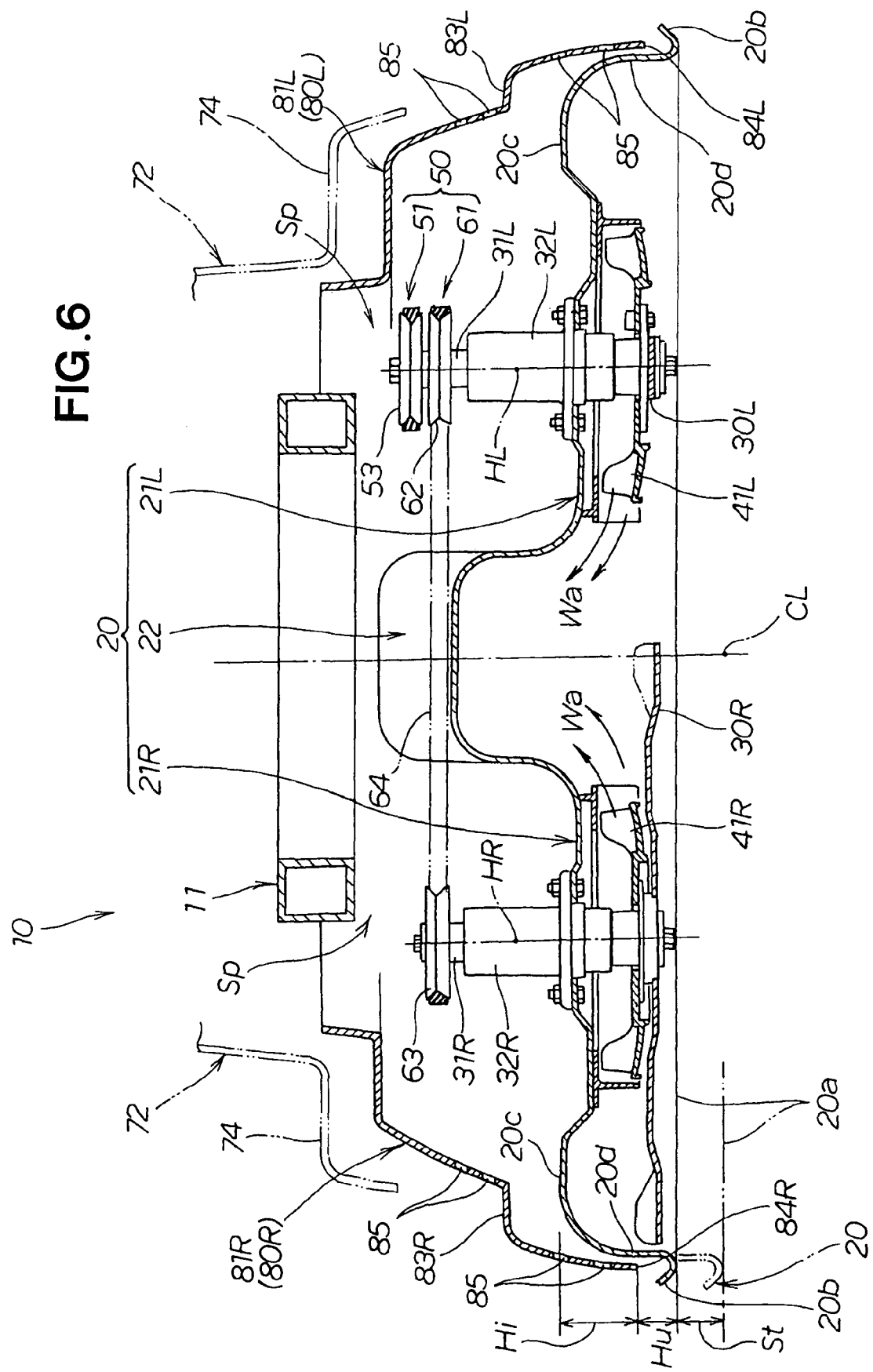
FIG. 6 is a cross-sectional view taken along line 6-6 of FIG. 2.
Figure 7:
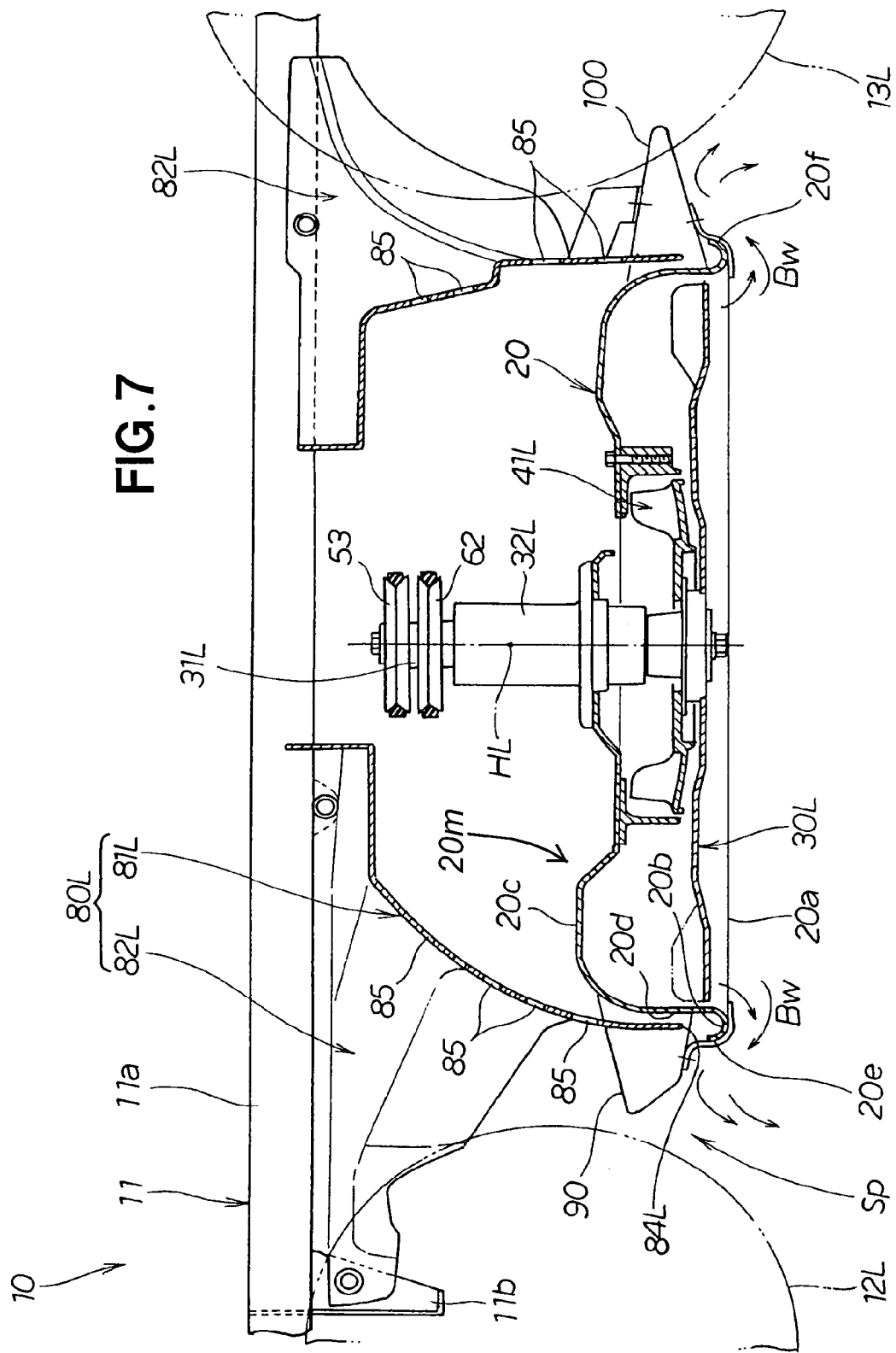
FIG. 7 is a cross-sectional view taken along line 7-7 of FIG. 2.

The left and right cutter blades 30L, 30R are accommodated inside the cutter deck 20, and are rotatably arranged in substantially the same plane as each other, as shown in FIGS. 5 to 7. Specifically, the cutter deck 20 rotatably supports two vertically arranged left and right drive shafts 31L, 31R via bearing parts 32L, 32R, respectively, at the centers HL, HR of the left half body 21L and the right half body 21R. The left and right drive shafts 31L, 31R have the cutter blades 30L, 30R separately mounted on the lower end parts inside the cutter deck 20, and protrude upward from the upper surface 20c of the cutter deck 20.

The left and right cutter blades 30L, 30R (cutting blades) are mutually offset in phase by 90° and rotate in mutually opposite directions. Specifically, the left cutter blade 30L rotates in the counterclockwise direction (the direction of the arrow Ru), and the right cutter blade 30R rotates in the clockwise direction (the direction of the arrow Rc) when the cutter blades 30L, 30R are viewed from below.

The left cutter blade 30L is a long narrow blade formed symmetric to the left drive shaft 31L, has a blade 30a at the front edge with respect to the direction of rotation, and has an air lift part 30b at the rear edge. The cutter blade 30L rotates in the direction of the arrow Ru, whereby grass is cut by the blade 30a, and an air stream, i.e., rotating stream Ws (transport airflow Ws), that rotates in the left scroll part 23L (FIG. 4) is generated by the air lift part 30b.

The right cutter blade 30R has the same configuration as the left cutter blade 30L and is provided with a blade 30a and an air lift part 30b. An air stream, i.e., rotating stream Ws (transport airflow Ws), that rotates in the right scroll part 23R (FIG. 4) is generated by the air lift part 30b.

The left and right auxiliary fans 41L, 41R are provided for increasing the flow rate of the transport airflow Ws generated by the left and right cutter blades 30L, 30R, and one each is disposed directly above the left and right cutter blades 30L, 30R inside the cutter deck 20.

The transmission section 50 transmits the power of the power source 16 (FIG. 1) to the left and right cutter blades 30L, 30R and is disposed in the gap between the vehicle body 11 and the cutter deck 20, as shown in FIGS. 2, 6, and 7. In other words, the transmission section 50 is disposed in proximity to an upper surface 20c of the cutter deck 20. The transmission section 50 is, e.g., a belt-type transmission mechanism and has a first transmission section 51 and a second transmission section 61.

The first transmission section 51 has a drive pulley 52 mounted on the output shaft 16a of the power source 16, a driven pulley 53 mounted on the upper end part of the left drive shaft 31L, and a belt 54 extending between the drive pulley 52 and the driven pulley 53. The second transmission section 61 has a drive pulley 62 mounted on the left drive shaft 31L, a driven pulley 63 mounted on the right drive shaft 31R, and a belt 64 extending between the drive pulley 62 and the driven pulley 63.

The second transmission section 61 furthermore has a clutch 65 and an idle pulley 67. The clutch 65 is a belt tension mechanism in which power is transmitted by pressing a clutch pulley 66 against the belt 64 in accordance with manual operation of a clutch operation member (not shown), and power is not transmitted by returning the clutch pulley 66 and loosening the belt 64. The idle pulley 67 guides the belt 64 in a predetermined direction.

In this manner, the first and second transmission sections 51, 61 are disposed in proximity to an upper surface 20c of the cutter deck 20.

The riding lawn mower 10 having the configuration described above cuts grass and generates a transport airflow Ws inside the cutter deck 20 by causing the cutter blades 30L, 30R to rotate, as shown in FIGS. 1 and 5. At this point, the auxiliary fans 41L, 41R generate an auxiliary transport airflow Wa. The transport airflows Ws, Wa transport grass clippings from inside the cutter deck 20 to the grass clippings container 42, which holds the grass clippings. The mowing work can proceed by causing the riding lawn mower 10 to travel by self-propulsion in the forward direction.

The entire upper half part of the riding lawn mower 10 is covered by a cowl 70, as shown in FIG. 1. The cowl 70 has a front cowl 71, a middle cowl 72, and a rear cowl 73.

The front cowl 71 covers the power source 16 and the front upper part of the vehicle body 11. The middle cowl 72 covers the center upper part of the vehicle body 11, the upper surface 20c of the cutter deck 20, and the upper surface of the transmission section 50. The middle cowl 72 has a stepped floor 74 that is integrally formed for resting the feet of a worker seated on the rider's seat 14. The upper surface 20c of the cutter deck 20 and the upper surface of the transmission section 50 are primarily covered by the stepped floor 74, as shown in FIG. 6. The rear cowl 73 covers the rear upper part of the vehicle body 11. A container cover 75 for covering the grass clippings container 42 is mounted on the rear upper end of the rear cowl 73.

The left half of the left half body 21L of the cutter deck 20 protrudes from the vehicle body 11 to the left exterior direction, as shown in FIGS. 2 and 6. The protruding left half is positioned between the left front and rear wheels 12L, 13L. One the other hand, the right half of the right half body 21R of the cutter deck 20 protrudes from the vehicle body 11 to the right exterior direction. The protruding right half is positioned between the right front and rear wheels 12R, 13R. Since the left half and the right half protrude laterally from the vehicle body 11, the transmission section 50 also protrudes laterally from the vehicle body 11 by a commensurate amount.

In the riding lawn mower 10, left and right covers 80L, 80R thus entirely cover the transmission section 50 and the left and right halves protruding laterally from the vehicle body 11. In other words, the riding lawn mower 10 is provided with left and right covers 80L, 80R, as shown in FIGS. 1 and 2. The covers 80L, 80R may, for example, be articles molded from resin.

Figure 8:
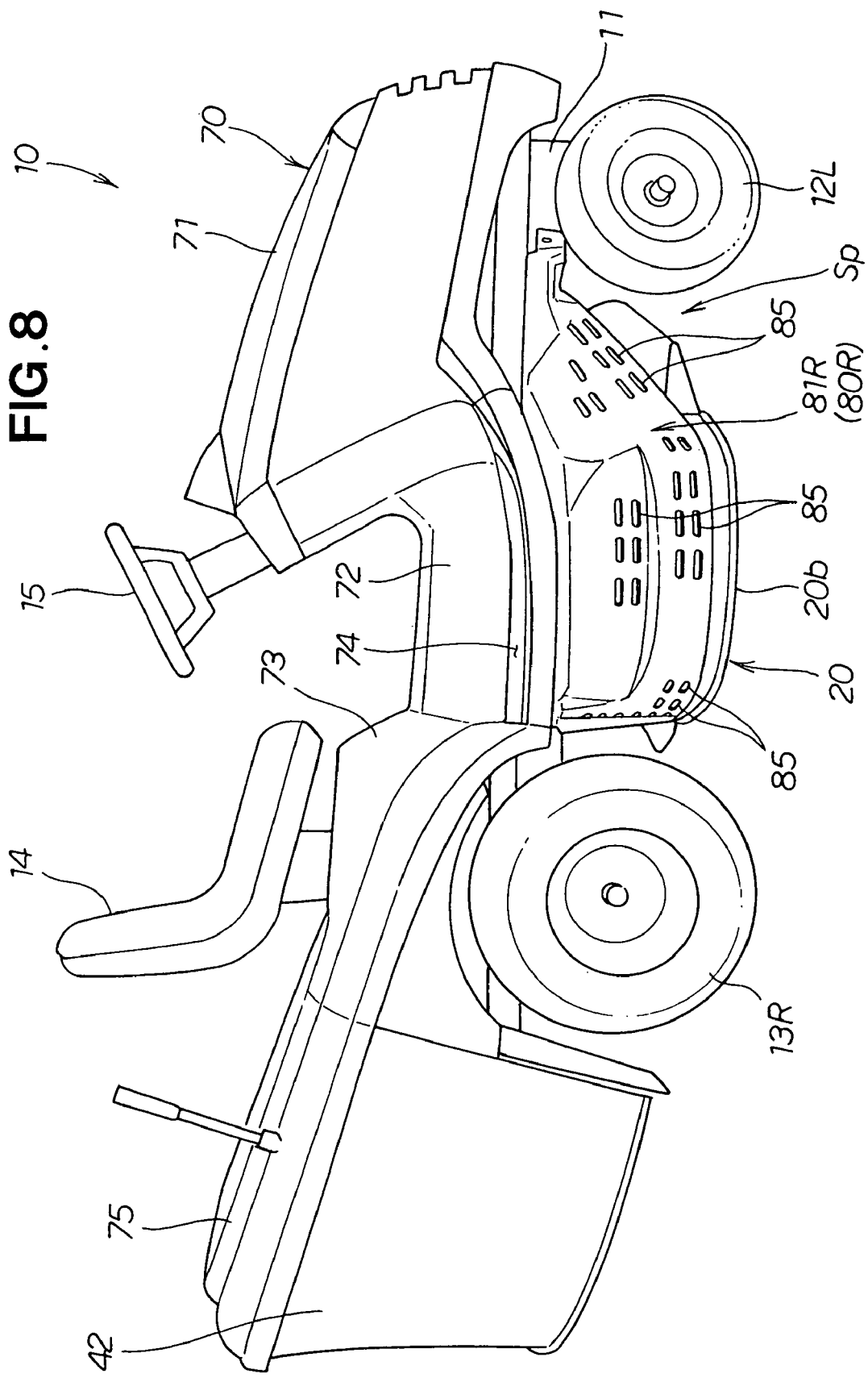
FIG. 8 is a right side view of the riding lawn mower of FIG. 1.

The covers 80L, 80R are described below with reference to FIGS. 8 and 9.

The left cover 80L is a member for enclosing a space Sp below the vehicle body 11 across substantially the entire range between the left front and rear wheels 12L, 13L, as shown in FIGS. 2 and 6. The right cover 80R encloses the space Sp below the vehicle body 11 across substantially the entire range between the right front and rear wheels 12R, 13R. Therefore, the grass clippings dispersed from inside the cutter deck 20 to the exterior can be inhibited from accumulating on the upper surface 20c of the cutter deck 20 and about the transmission section 50, because the left and right covers 80L, 80R cover the left and right side parts of the cutter deck 20 and the left and right side parts of the transmission section 50.

Figure 9:
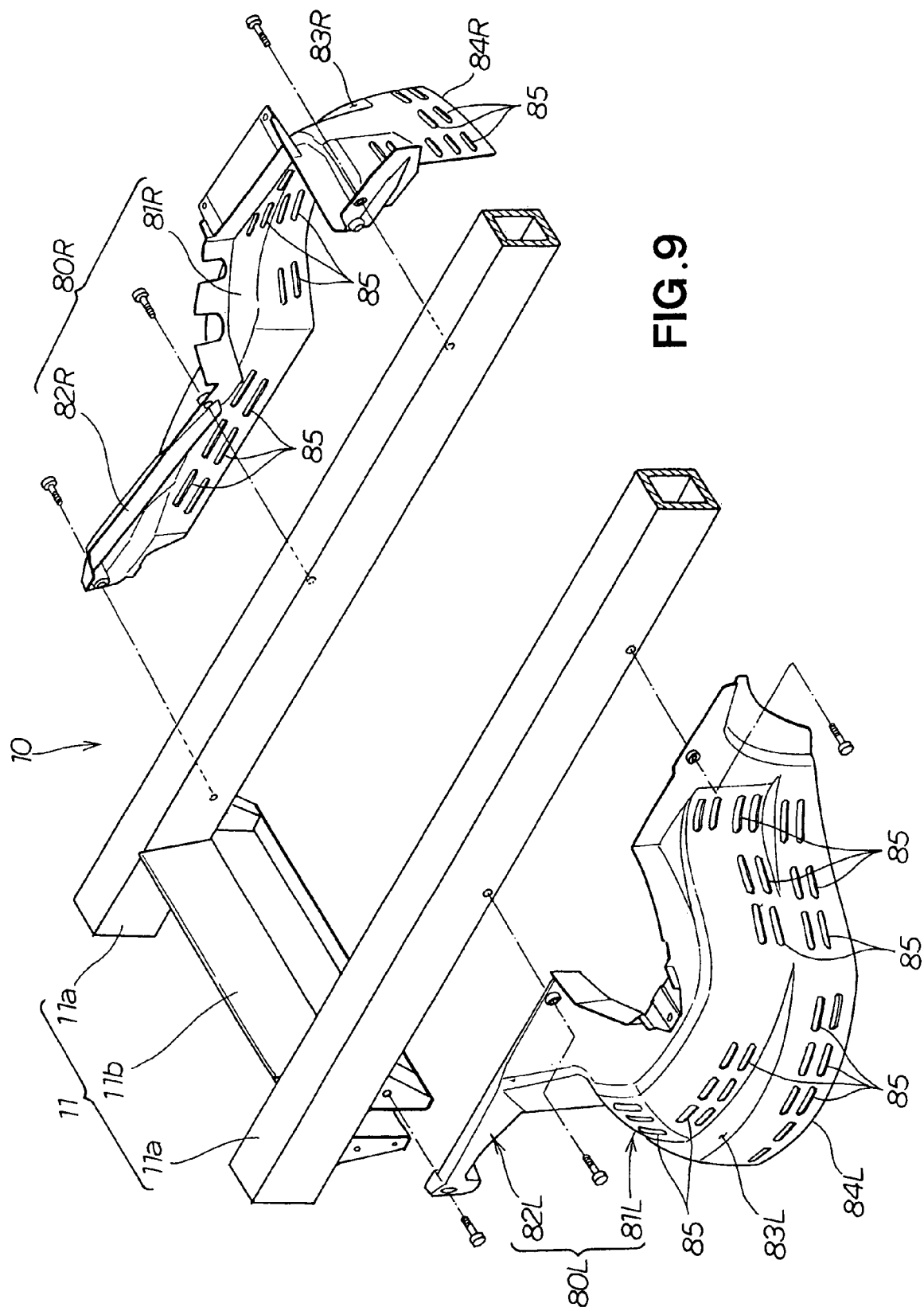
FIG. 9 is an exploded view of the left and right covers and the vehicle body of FIG. 2.

The left and right covers 80L, 80R are removably mounted side covers that are overlaid on the outside (laterally) of the left and right side frames 11a, 11a in the width direction of the vehicle, as shown in FIGS. 2 and 9. The work of attaching and removing the covers 80L, 80R on the vehicle body 11 is thus simplified because the covers 80L, 80R are configured to be overlaid and mounted on the sides of the vehicle body 11. Accordingly, the transmission section 50 can be readily maintained and inspected.

The left cover 80L is an integrally molded article having a cover body 81L and a flange part 82L. The left cover body 81L is formed substantially in the shape of a hollow sphere cut into four parts (left half of a dome). The cover body 81L is formed in a shape that follows the left half on the left half body 21L of the cutter deck 20. Accordingly, the cover body 81L can cover the left half of the left half body 21L of the cutter deck 20 from above or on the outside in the width direction of the vehicle.

Similarly, the right cover 80R is an integrally molded article having a cover body 81R and a flange part 82R. The right cover body 81R is formed substantially in the shape of a hollow sphere cut into four parts (right half of a dome). The cover body 81R is formed in a shape that follows the right half on the right half body 21R of the cutter deck 20. Accordingly, the cover body 81R can cover the right half of the right half body 21R of the cutter deck 20 from above or on the outside in the width direction of the vehicle.

The left and right flange parts 82L, 82R extend in the forward/rearward direction, and apertures of the cover bodies 81L, 81R are aligned in the lengthwise center parts thereof. The left and right covers 80L and 80R are mounted on the vehicle body 11 by overlaying the left and right flange parts 82L, 82R on the side frames 11a, 11a and bolting the left and right flange parts to the vehicle body 11.

The side parts of the left and right cover bodies 81L, 18R are formed into steps, and the stepped surfaces 83L, 83R cover at least a portion of the upper surface 20c of the cutter deck 20, as shown in FIG. 6, while allowing elevator movement of the cutter deck 20. Described more specifically, the stepped surfaces 83L, 83R are substantially horizontal flat surfaces that cover at least the peripheral edge of the upper surface 20c of the cutter deck 20. In this manner, the upper part of the left and right covers 80L, 80R can be made smaller than the lower part by forming the side parts of the cover bodies 81L, 81R into steps. Accordingly, the left and right covers 80L, 80R can be made smaller.

The left and right cover bodies 81L, 81R are formed in a shape that follows the cutter deck 20. Accordingly, the left and right covers 80L, 80R can be made even smaller while allowing the elevator movement of the cutter deck 20.

The stepped surfaces 83L, 83R more preferably have a shape that substantially follows the upper surface 20c of the cutter deck 20. Such a configuration allows the covers 80L, 80R to be made smaller because the stepped surfaces 83L, 83R can be brought close to the upper surface 20c of the cutter deck 20.

FIG. 6 shows that the cutter deck 20 is in the upper-limit position with respect to the vehicle body 11. In this case, the lower surfaces 84L, 84R of the left and right cover bodies 81L, 81R are in a high position at a dimension Hu from the lower surface 20a of the cutter deck 20. The reference symbol Hi is the height from the lower surfaces 84L, 84R of the left and right cover bodies 81L, 81R to the upper surface 20c of the cutter deck 20. The height Hi is the vertical overlap distance (overlap dimension) over which there is an overlap between the side surface of the cutter deck 20 and the cover bodies 81L, 81R. The stepped surfaces 83L, 83R are in a higher position than the cutter deck 20 of the upper-limit position indicated by the solid line. In the upper-limit position of the cutter deck 20, as shown, the vertical overlap distance Hi between the side surface of the cutter deck 20 and the cover bodies 81L, 81R is more than half of the total height of the cutter deck 20, where the total height of the cutter deck is shown as Hi+Hu.

The cutter deck 20 is elevated and lowered in an elevation range St (displacement distance) from the upper-limit position indicated by the solid line to the lower-limit position indicated by the imaginary line. The overlap dimension Hi is given considerable leeway in relation to the elevation range St (St<Hi). Accordingly, the left and right cover bodies 81L, 81R constantly cover the external peripheral surface of the cutter deck 20 regardless of the elevation height of the cutter deck 20.

The upper surface 20c of the cutter deck 20 and the upper part of the transmission section 50 are covered by the cowl 70 (the middle cowl 72 and the stepped floor 74 in particular), as shown in FIGS. 1, 2, 6, and 8. Accordingly, a portion of the upper end part of the left and right cover bodies 81L, 81R is open.

The left and right cover bodies 81L, 81R have a plurality of small holes 85 in the portion facing the side part 20d of the cutter deck 20. The small holes 85 are holes for allowing the cutter deck 20 inside the covers 80L, 80R to be viewed from the exterior. Accordingly, the state of accumulation of dispersed grass clippings on the upper surface of the cutter deck 20c and the transmission section 50 can be readily confirmed from the exterior. For example, the state of accumulation is confirmed prior to work, and cleaning is performed as required. As a result, the transmission section 50 is constantly maintained in an optimal operating state. The interior of the covers 80L, 80R can furthermore be washed by spraying water from the exterior into the covers 80L, 80R via the small holes 85. Also, air permeability and ventilation inside and outside the covers 80L, 80R can be provided via the small holes 85.

A large number of the small holes 85 is preferably formed across the entire area of the portion of the left and right cover bodies 81L, 81R that faces the cutter deck 20. For example, the small holes 85 are also formed in the left and right flange parts 82L, 82R in addition to the left and right cover bodies 81L, 81R.

The plurality of small holes 85 preferably comprises horizontal long holes having a size that allows the cutter deck 20 inside the left and right covers 80L, 80R to be observed from the exterior, as shown in FIG. 1. The dimensions of the long holes are preferably set to a width of 8 to 12 mm and a length of 40 to 60 mm. When the dimensions of the small holes 85 are as noted above, the interior of the left and right covers 80L, 80R can be readily viewed from the exterior. Since it is difficult for foreign matter to enter into the covers 80L, 80R from the exterior during operation, the transmission section 50 can be protected against foreign matter despite the presence of the small holes 85.

The plurality of small holes 85 is not limited to being long horizontal holes, and it is also possible to use, e.g., long vertical holes, or round, angular, or elliptical holes. In such a case as well, the size of the narrowest portion of the holes is preferably set to a range of 8 to 12 mm.

The cutter deck 20 is provided with a front guard section 90 and a rear guard section 100, as shown in FIGS. 3, 7, 10, and 11. The front and rear guard sections 90, 100 are members for preventing the upward movement (flow in the direction of the arrow Bw shown in FIG. 7) of grass clippings and the transport airflow that has escaped from the cutter deck 20 to the exterior. The front and rear guard sections 90, 100 are omitted in FIGS. 4 and 5.

The front guard section 90 is a substantially horizontal flat tabular member that extends forward from the front-end part 20e of the main deck body 20m and is positioned on the centerline CL in the width direction of the vehicle in the cutter deck 20, as shown in FIG. 3. On the other hand, the rear guard section 100 is a substantially horizontal flat tabular member that extends rearward from the rear-end part 20f of the main deck body 20m and is positioned on the centerline CL in the width direction of the vehicle in the cutter deck 20.

As used herein, the phrase "reference line LL of the left half body" refers to the line LL that is parallel to the centerline CL in the width direction of the vehicle and that passes through the center HL of the left half body 21L when the cutter deck 20 is viewed from above, as shown in FIG. 3. The phrase "reference line LR of the right half body" refers to the line LR that is parallel to the centerline CL in the width direction of the vehicle and that passes through the center HR of the right half body 21R. When the cutter deck 20 is viewed from above, the front and rear guard sections 90, 100 are provided across substantially the entire range from the reference line LL of the left half body to the reference line LR of the right half body. Thus, the reason that the front and rear guard sections 90, 100 are provided across the entire range is as follows.

The transport airflows Ws, Wa, and the grass clippings transported by the transport airflows Ws, Wa readily gather in the front and rear inside the cutter deck 20 on the center line CL in the width direction of the vehicle, as shown in FIG. 5. In particular, the left and right transport airflows Ws, Wa merge in the center in the width direction of the vehicle in the front area inside the cutter deck 20. Accordingly, the transport airflows Ws, Wa and the grass clippings readily escape to the exterior from the front end part 20e and the rear end part 20f of the cutter deck 20. The transport airflows Ws, Wa and grass clippings that have escaped to the exterior move upward. In order to prevent such upward movement, the front and rear guard sections 90, 100 are provided across substantially the entire range from the reference line LL of the left half body to the reference line LR of the right half body.

Figure 10:
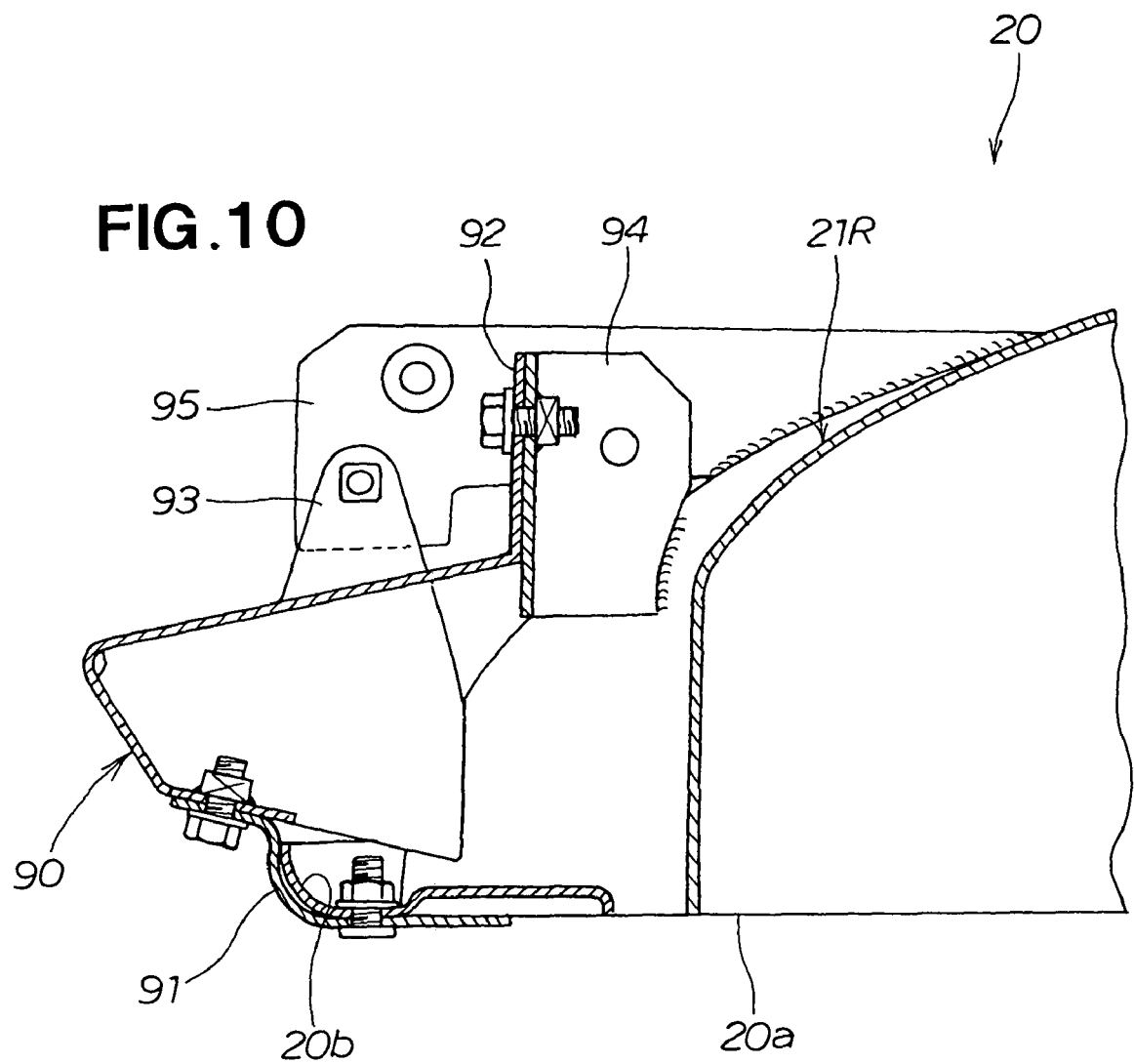
FIG. 10 is a cross-sectional view taken along line 10-10 of FIG. 3.

When viewed from the side, the front guard section 90 is a substantially V-shaped member in which the front end has a pointed shape, as shown in FIGS. 3, 7, and 10. The lower surface of the front guard section 90 is detachably mounted on the flange 20b of the cutter deck 20 via a stay 91. The front guard section 90 has flanges 92, 93 on the upper surface, and the flanges 92, 93 are detachably mounted on brackets 94, 95 of the cutter deck 20.

Figure 11:
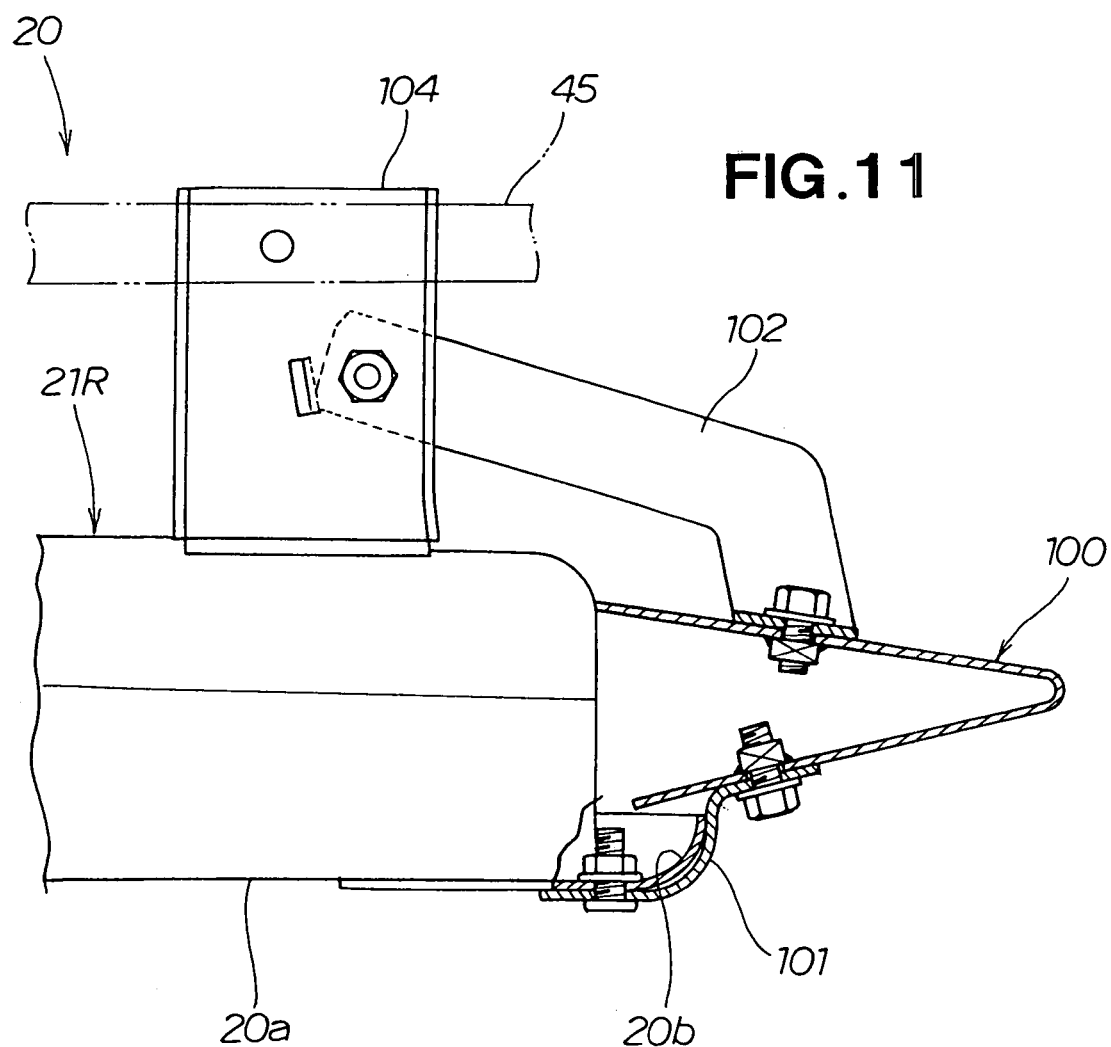
FIG. 11 is a cross-sectional view taken along line 11-11 of FIG. 3.

When viewed from the side, the rear guard section 100 is a substantially V-shaped member in which the rear end has a pointed shape, as shown in FIGS. 3, 7, 11. The lower surface of the rear guard section 100 is detachably mounted on the flange 20b of the cutter deck 20 via a stay 101. The upper surface of the rear guard section 100 is detachably mounted on brackets 104, 105 of the cutter deck 20 via stays 102, 103.

The front guard section 90 prevents grass clippings that have escaped together with the stream in the direction of arrow Bw, i.e., the transport airflows Ws, Wa (FIG. 5) directed outward from the front end 20e (front edge) of the cutter deck 20, from moving upward to the upper surface 20c of the cutter deck 20, and causes the grass clippings to fall downward, as shown in FIG. 7. The rear guard section 100 prevents grass clippings that have escaped together with the stream in the direction of arrow Bf, i.e., the transport airflows Ws, Wa directed outward from the rear end 20f (rear edge) of the cutter deck 20, from moving upward to the upper surface 20c of the cutter deck 20, and causes the grass clippings to fall downward. Accordingly, the accumulation of dispersed grass clippings on the upper surface 20c of the cutter deck 20 and about the transmission section 50 (FIG. 2) can be further reduced.

In the present invention, the number of cutter blades 30L, 30R is not limited to two blades on the left and right, and at least one may be used. For example, it is also possible to provide three cutter blades on the left and right.

The shape and dimensions of the cutter deck 20 may be varied in accordance with the number, shape, and size of the cutter blades 30L, 30R.

The transmission section 50 is not limited to a belt-type transmission mechanism, and a chain-type or gear-type configuration may be used, for example.

The left and right covers 80L, 80R can have shapes and dimensions that allow the space Sp below the vehicle body 11 to be enclosed across substantially the entire range between the left front and rear wheels 12L, 13L and the right front and rear wheels 12R, 13R, respectively.

The front and rear guard sections 90, 100 can have any shape and dimension as long as the sections can prevent the upward movement of the transport airflows and grass clippings that have escaped from the cutter deck 20 to the exterior.

The riding lawn mower 10 of the present invention can be used as a riding lawn mower provided with two cutter blades 30L, 30R on the left and right.

Obviously, various minor changes and modifications of the present invention are possible in light of the above teaching. It is therefore to be understood that within the scope of the appended claims the invention may be practiced otherwise than as specifically described.

What is claimed is:

1. A riding lawn mower comprising:
  a vehicle body having rear wheels and front wheels attached thereto;
  a cutter deck having an open lower surface, the cutter deck being elevatably disposed in a central lower section of the vehicle body;
  cutter blades accommodated inside the cutter deck; and
  a transmission section for transmitting power of a power source to the cutter blades, the section being disposed in proximity to an upper surface of the cutter deck,
  wherein a pair of left and right covers for enclosing a space below the vehicle body are provided separately from the cutter deck, attached to the vehicle body and extending across substantially the entire range between the front and rear wheels, the covers formed from a substantially rigid material,
  wherein each of the covers respectively comprises a lower portion for covering a side part of the cutter deck, an intermediate step portion comprising a substantially horizontal flat surface, and an upper portion for covering a side part of the transmission section, the upper portion, the intermediate step portion and the lower portion integrally formed as a unitary member, and wherein the covers are mounted on the vehicle body and have a plurality of small holes formed therein for allowing the cutter deck inside the covers to be viewed from the outside across a range facing the side part of the cutter deck.

2. The lawn mower of claim 1, wherein the intermediate step portions of the covers are configured so as to cover at least a portion of the upper surface of the cutter deck while allowing elevatable movement of the cutter deck.

3. The lawn mower of claim 1, wherein the cutter deck comprises:
  a main deck body for housing said cutter blades, said main deck body having a front edge part and a rear edge part, and
  front and rear guard sections formed attached to the front edge part and the rear edge part of the main deck body, respectively, said guard sections configured and arranged to inhibit transport airflow and grass clippings, that have escaped from the cutter deck to the exterior, from moving upward,
  wherein the front guard section extends forward from a front end part of the main deck body, and wherein the rear guard section extends rearward from a rear end part of the main deck body.

4. The lawn mower of claim 1, wherein the covers have a side part shaped as a step; and stepped surfaces thereof are configured so as to cover at least a portion of the upper surface of the cutter deck while allowing elevatable movement of the cutter deck.

5. A riding lawn mower comprising:
- a vehicle body having rear wheels and front wheels attached thereto, said vehicle body comprising left and right side frames extending in a substantially longitudinal direction and at least one cross member extending between and interconnecting said side frames;
- a cutter deck having an open lower surface, the cutter deck being movably disposed at a central lower section of the vehicle body;
- a plurality of cutter blades accommodated inside the cutter deck; and
- a transmission section for transmitting power from a power source to the cutter blades, the section being disposed proximate an upper surface of the cutter deck,
- wherein a pair of left and right covers for enclosing a space below the vehicle body are provided separately from the cutter deck, said covers respectively attached to the left and right side frames of the vehicle body and extending along an area between the front and rear wheels,
- wherein each of the covers respectively comprises:
  - a lower portion for covering a side part of the cutter deck,
  - an upper portion for covering a side part of the transmission section, and
  - a substantially horizontal step portion interconnecting the upper and lower portions,
- and wherein each of the covers is integrally formed, as a unitary member, from a plastic resin material, and wherein the covers each have a plurality of small holes formed therein for allowing the cutter deck, inside the covers, to be viewed from an area outside of the covers.

6. The lawn mower of claim 5, wherein the cutter deck comprises:
- a main deck body for housing said cutter blades, said main deck body having a front edge part and a rear edge part and having a flange extending therearound, and
- front and rear guard sections attached to the front edge part and the rear edge part of the main deck body, respectively, for preventing transport airflow and grass clippings that have escaped from the cutter deck to the exterior from moving upward,
- wherein the front guard section extends forward from a front end part of the main deck body, and wherein the rear guard section extends rearward from a rear end part of the main deck body.

* * * * *